(12) United States Patent
Effenberger

(10) Patent No.: US 12,024,115 B2
(45) Date of Patent: Jul. 2, 2024

(54) METHOD FOR PRODUCING A VEHICLE, AND SAFETY BELT ASSEMBLY

(71) Applicant: Volkswagen Aktiengesellschaft, Wolfsburg (DE)

(72) Inventor: Witali Effenberger, Wendeburg (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 153 days.

(21) Appl. No.: 17/957,813

(22) Filed: Sep. 30, 2022

(65) Prior Publication Data

US 2023/0024985 A1    Jan. 26, 2023

Related U.S. Application Data

(63) Continuation of application No. PCT/EP2021/057878, filed on Mar. 26, 2021.

(30) Foreign Application Priority Data

Apr. 2, 2020 (DE) ...................... 10 2020 204 291.8

(51) Int. Cl.
*B60R 22/12* (2006.01)
*B60R 22/48* (2006.01)
*B60R 22/02* (2006.01)

(52) U.S. Cl.
CPC .............. *B60R 22/12* (2013.01); *B60R 22/48* (2013.01); *B60R 2022/029* (2013.01); *B60R 2022/485* (2013.01)

(58) Field of Classification Search
CPC ..... B60R 22/12; B60R 22/48; B60R 2022/29; B60R 2022/485
See application file for complete search history.

(56) References Cited

U.S. PATENT DOCUMENTS

| 6,024,382 A | 2/2000 | Baumann |
| 7,916,008 B2 | 3/2011 | Nathan et al. |

(Continued)

FOREIGN PATENT DOCUMENTS

| CN | 106274792 A | 1/2017 |
| DE | 102006008919 A1 | 12/2006 |

(Continued)

OTHER PUBLICATIONS

International Search Report dated Jun. 24, 2021 in corresponding application PCT/EP2021/057878.

*Primary Examiner* — Hoi C Lau

(74) *Attorney, Agent, or Firm* — Muncy, Geissler, Olds & Lowe, P.C.

(57) ABSTRACT

A method for manufacturing a vehicle, in which, on a production line of a vehicle-manufacturing plant, attachments are mounted on a vehicle body, to each of which an attachment transponder is fastened, which, after the particular attachment is installed in the vehicle, is detected with the aid of an RFID reading device for the purpose of a construction state documentation, a belt retractor of a safety belt assembly being installed as an attachment in a cavity of a vehicle body column formed as a hollow girder on the production line. A belt retractor transponder is assigned to the belt retractor. The belt retractor transponder is not fastened directly to the belt retractor but rather to a belt strap of the belt retractor outside the body column cavity.

10 Claims, 6 Drawing Sheets

(56) References Cited

U.S. PATENT DOCUMENTS

| | | | |
|---|---|---|---|
| 8,013,727 B2 | 9/2011 | Specht et al. | |
| 8,510,919 B1* | 8/2013 | Carney | A44B 11/003 |
| | | | 40/640 |
| 9,415,748 B2* | 8/2016 | Sugawara | B60R 22/48 |
| 10,717,408 B1* | 7/2020 | Kim | B60R 22/12 |
| 11,603,060 B2* | 3/2023 | Thomas | B60R 21/01536 |
| 2010/0087748 A1* | 4/2010 | Tobola | A61B 5/113 |
| | | | 600/529 |
| 2015/0090527 A1 | 4/2015 | Salour et al. | |
| 2015/0145666 A1* | 5/2015 | Sugawara | B60R 22/48 |
| | | | 340/457.1 |
| 2018/0072255 A1 | 3/2018 | Foltin | |
| 2020/0254966 A1 | 8/2020 | Ots et al. | |
| 2021/0347323 A1* | 11/2021 | Thomas | B60R 21/01538 |
| 2023/0024985 A1* | 1/2023 | Effenberger | B60R 22/48 |

FOREIGN PATENT DOCUMENTS

| | | |
|---|---|---|
| DE | 102006055141 A1 | 6/2007 |
| DE | 102007058278 A1 | 6/2009 |
| DE | 202010001443 U1 | 5/2010 |
| DE | 102015106450 A1 | 10/2016 |
| DE | 102018108341 A1 | 10/2019 |
| DE | 102018215364 A1 | 3/2020 |
| EP | 2189372 A1 | 5/2010 |
| EP | 3275770 A1 | 1/2018 |
| WO | WO9829283 A1 | 7/1998 |
| WO | WO9832190 A2 | 7/1998 |
| WO | WO2009008949 A1 | 1/2009 |
| WO | WO2016145054 A1 | 9/2016 |
| WO | WO2019072748 A1 | 4/2019 |

* cited by examiner

METHOD FOR PRODUCING A VEHICLE, AND SAFETY BELT ASSEMBLY

This nonprovisional application is a continuation of International Application No. PCT/EP2021/057878, which was filed on Mar. 26, 2021, and which claims priority to German Patent Application No. 10 2020 204 291.8, which was filed in Germany on Apr. 2, 2020, and which are both herein incorporated by reference.

BACKGROUND OF THE INVENTION

Field of the Invention

The present invention relates to a method for manufacturing a vehicle as well as a safety belt assembly for a vehicle.

Description of the Background Art

While manufacturing a vehicle, a vehicle body is transferred in the vehicle-manufacturing plant along a series of workstations of a production line, in which attachments may be mounted on the vehicle body. The attachments may be identified in each case with the aid of an RFID transponder for the purpose of an automated construction state documentation. These parts may be scanned at an RFID gate acting as a reader at the end of the production line, by which means the attachments assigned in each case may be documented. In the case of the RFID technology, the communication between the RFID transponder and the reader takes place wirelessly or contactlessly by radio transmission. A direct visual contact is not necessary.

In a generic method, during the vehicle manufacturing, a belt retractor of a safety belt assembly is positioned in a cavity of a vehicle body formed as a sheet metal hollow girder. The belt retractor installed in the cavity of the vehicle body column is largely shielded against an electromagnetic field emitted by the RFID gate. Due to this shielding, the RFID technology may not be used for the belt retractor in the prior art.

A safety belt including an early warning system is known from CN 106274792 A. A safety belt system is known from DE 10 2007 058 278 A1. Further safety belt systems are known from US 2018/0072255 A1, from WO 98/32190 A2, from WO 2009/008949 A1, and from WO 2016/145054 A1.

SUMMARY OF THE INVENTION

It is therefore an object of the present invention to provide a method for manufacturing a vehicle, in which an automated construction state documentation is easily made possible for a belt retractor installed in the vehicle body.

In an exemplary embodiment, the invention is based on the fact that, in the prior art, the attachments suitable for using the RFID technology are identified directly with the aid of an assigned attachment transponder. The attachments are identified prior to being mounted in the vehicle body. In a departure therefrom, no direct identification of the belt retractor takes place by means of a belt retractor transponder according to the characterizing part of claim 1. Instead, the belt retractor transponder is positioned independently of the location of the belt retractor on the belt strap of the belt retractor outside the body column cavity. In this way, the belt retractor transponder is exposed in the vehicle interior of the vehicle body, whereby a data communication with the reader is possible.

According to the invention, the fact is used that the belt retractor, together with the belt strap as well as a belt end fitting situated at the end of the belt strap, is part of a safety belt assembly. The latter is installed in the vehicle body on the production line as a one-part premounted unit or attachment. In the installed state, the belt end fitting of the safety belt assembly may be fastened to an end fitting tensioner or directly in a stationary manner to the vehicle body in the vehicle interior.

With regard to an interference-free data communication between the belt retractor transponder and the RFID reader, it is preferred if the belt retractor transponder is largely protected against mechanical stresses or damage during the vehicle assembly on the production line. Against this background, it is preferred if the belt retractor transponder is fastened directly to the belt strap end of the belt strap fed out from the belt retractor.

In common practice, the connection of the belt strap end to the belt end fitting may be implemented as follows: The belt strap may thus be folded over at the belt strap end, forming a belt strap loop, which is guided through a belt eye of the belt end fitting. The belt end fitting may be mounted directly on the vehicle body or, alternatively, it may be mounted on an end fitting tensioner. The belt strap fold, together with the rest of the belt strap, forms a two-layer structure, in which the two belt strap layers are connected, in particular sewn, to each other. With regard to an installation site protected against external environmental influences, it is preferred if the belt retractor transponder is integrated into the two-layer structure made up of the belt strap fold and the belt strap. For a fastening which is particularly easy from a production standpoint, it is preferred if the belt retractor transponder is arranged between the two belt strap layers and is sewn therein.

The safety belt assembly may be premounted in a supplier factory for a mass production. In this case, the belt retractor transponder may already be fastened to the belt strap in the supplier factory.

The belt retractor transponder may be constructed from a chip and an antenna. In one design variant, the belt retractor transponder may be provided on a continuous film sheet together with a multiplicity of further belt retractor transponders. The continuous film sheet may be windable onto a roll. During the belt strap manufacturing process, the continuous film sheet may be integrated into the belt strap stretched along the belt strap longitudinal direction and also positioned between the two belt strap layers The continuous film sheet may extend completely over the entire length of the belt strap.

The belt strap may have an insert structure with warp and weft threads woven together. Of the warp threads, at least one modified warp thread may have an antenna property of an RFID transponder. In this case, at least one transponder chip may be positioned on the surface of the belt strap and be brought into contact with the modified warp thread. The transponder chip may be fastened to the surface of the belt strap in different ways. For example, the transponder chip may be positioned between a chip carrier and the surface of the belt strap. The chip carrier may be manufactured from plastic and be integrally connected to the belt strap by thermoforming.

Alternatively, the one-layer belt strap may have a weft thread layer, with weft thread layers situated one on top of the other in the direction of the belt strap thickness. The modified warp thread may be placed between the two weft layers, by which means the modified warp thread is protected against external mechanical influences. The modified warp thread may be outwardly exposed at only one contact point. The transponder chip may be in contact with the outwardly exposed, modified warp thread at the exposed contact point.

The belt retractor transponder may also be designed as a standard transponder. It may be glued or sewn onto the finished belt strap, for example, at the end of the belt strap.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
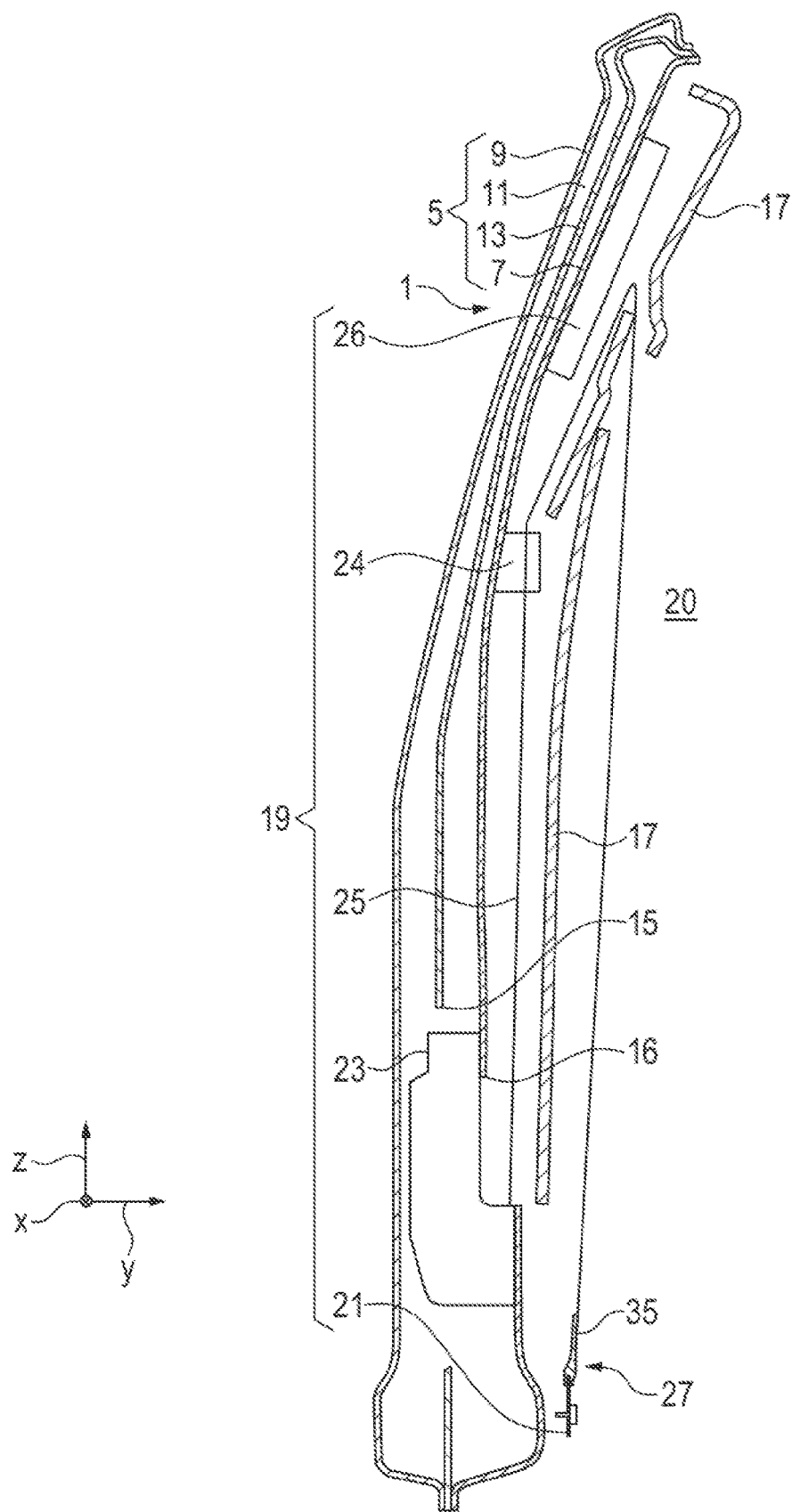
FIG. 1 shows a side wall body structure with a safety belt assembly installed therein in a sectional representation along a plane of intersection yz.

A side wall module of a vehicle body 1 is illustrated in a sectional representation in FIG. 1. Vehicle body 1 includes a door sill 3 on the floor side, which extends in vehicle longitudinal direction x between vehicle body columns, of which a B column 5 is shown as an example in FIG. 1. B column 5 connects door sill 3 to a roof structure of vehicle body 1 in vehicle vertical direction x. In FIG. 1, B column 5 is designed as a sheet metal hollow girder, which includes a sheet metal inner part 7 facing vehicle interior 20 and a sheet metal outer part 9 outside the vehicle. The sheet metal hollow girder formed by sheet metal inner part 7 and sheet metal outer part 9 limits a hollow profile 11, which runs in vehicle vertical direction z and is largely closed in cross-section. A reinforcing sheet metal part 13 extends in vehicle vertical direction z within hollow profile 11. In FIG. 1, mounting openings 15, 16 are formed in sheet metal inner part 7 as well as in reinforcing sheet metal part 13, so that a belt retractor 23 may be arranged in hollow profile 11 of B column 5.

Belt retractor 23 is part of a safety belt assembly 19. The latter additionally includes a belt strap 25, which is fed out from belt retractor 23, a height-adjustable deflection fitting 26 for belt strap 25, a belt deflector 24, as well as a belt end fitting 21 connected to belt strap end 27. In FIG. 1, belt end fitting 21 is shown still in the disassembled state. Belt end fitting 21 may be mounted in a stationary manner on the vehicle body via a screw connection. In FIG. 1, sheet metal inner part 7 of B column 5 as well as deflection fitting 26 and belt deflector 24 are covered by an indicated interior trim 17, shielded from view.

Figure 2:
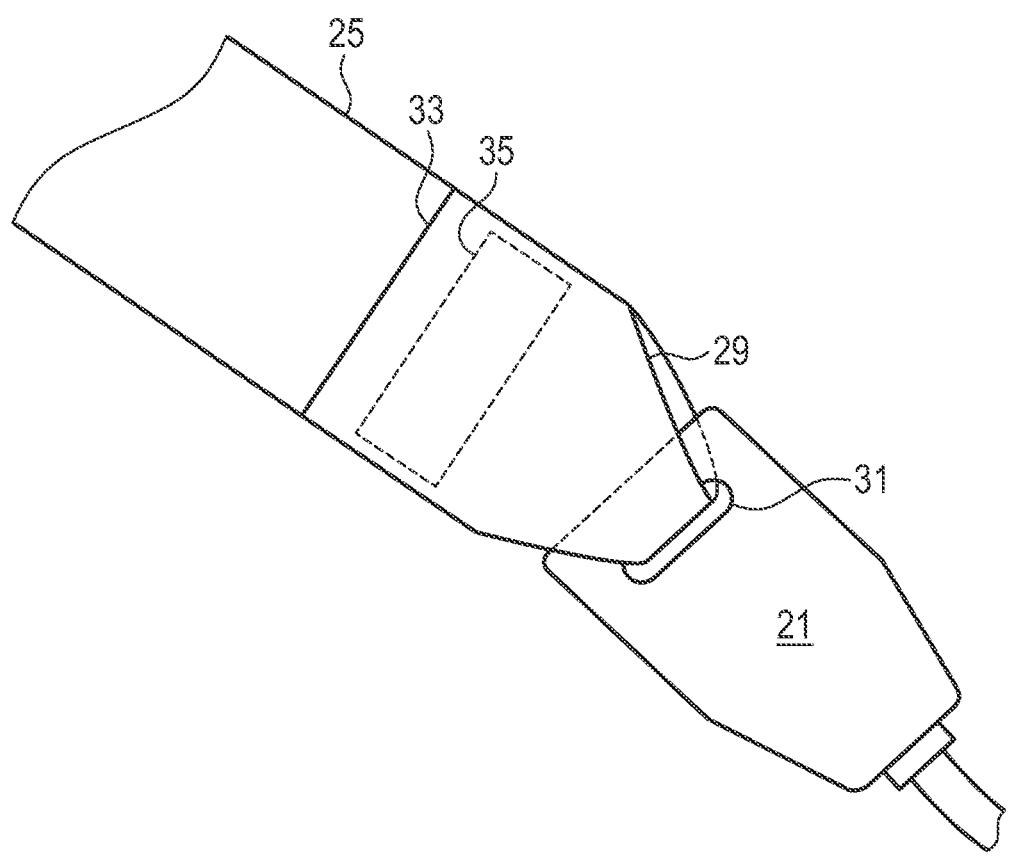
FIG. 2 shows a belt strap end connected to a belt end fitting in an enlarged partial view.
Figure 3:
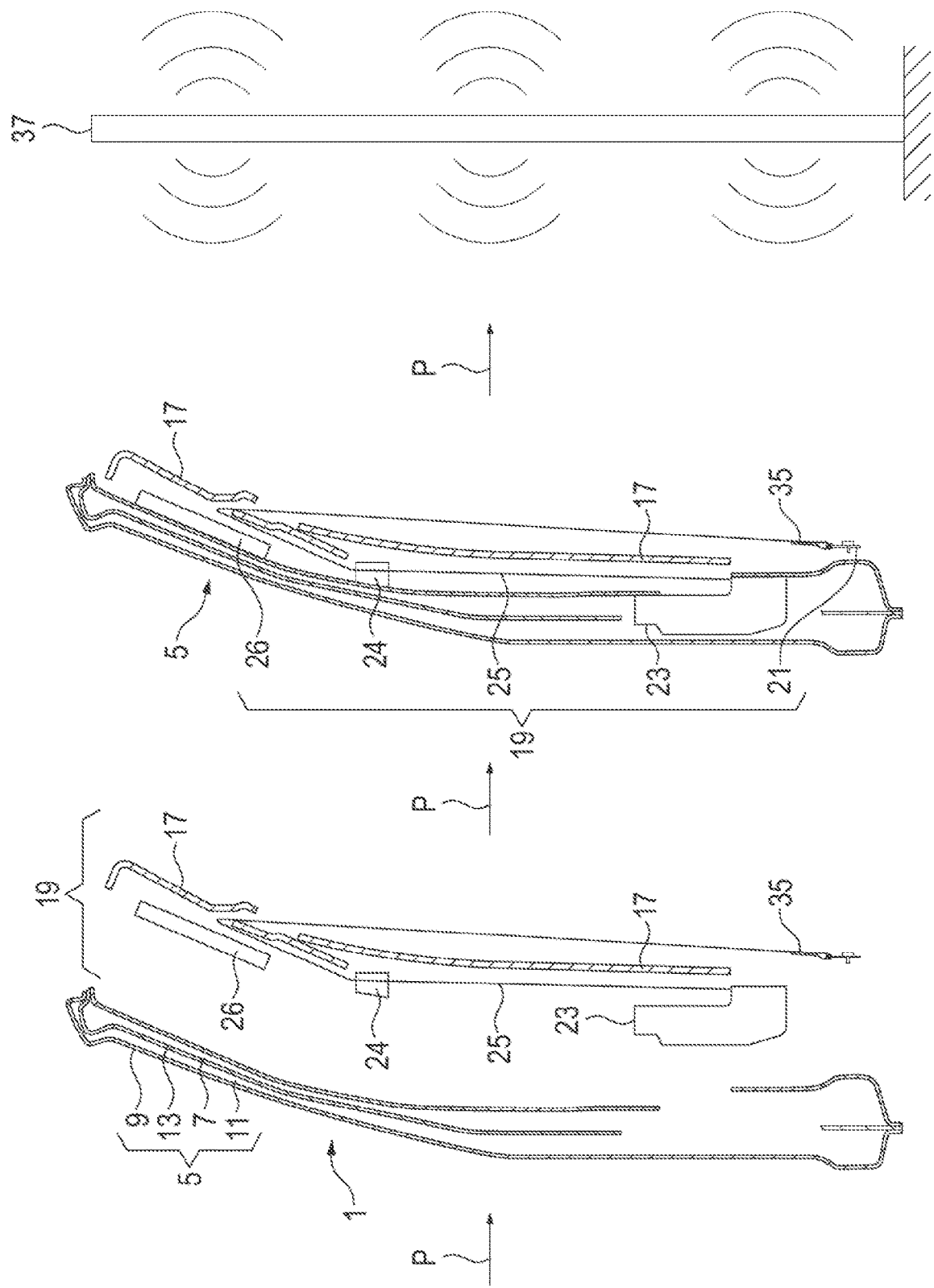
FIG. 3 shows a view, based on which process steps on a production line of a vehicle-manufacturing plant are illustrated.

For connection to belt end fitting 21, belt strap 25 is folded over at belt strap end 27, forming a belt strap loop 29 (FIG. 2), which is guided through a belt eye 31 of belt end fitting 21. Belt strap fold 33 and belt strap 25 form a two-layer structure in FIG. 1 or FIG. 2, in which the two belt strap layers are sewn to each other. A belt retractor transponder 35 is sewn between the two belt strap layers (i.e., belt strap 25 and belt strap fold 33). At the end of production line P, the belt retractor transponder may enter into data communication with an RFID gate 37 as a reading device. Actual belt retractor 23 positioned in hollow profile 11 and shielded against the electromagnetic field of RFID gate 37 may thereby be detected for the purpose of an automated construction state documentation by using the RFID technology.

Figure 4:
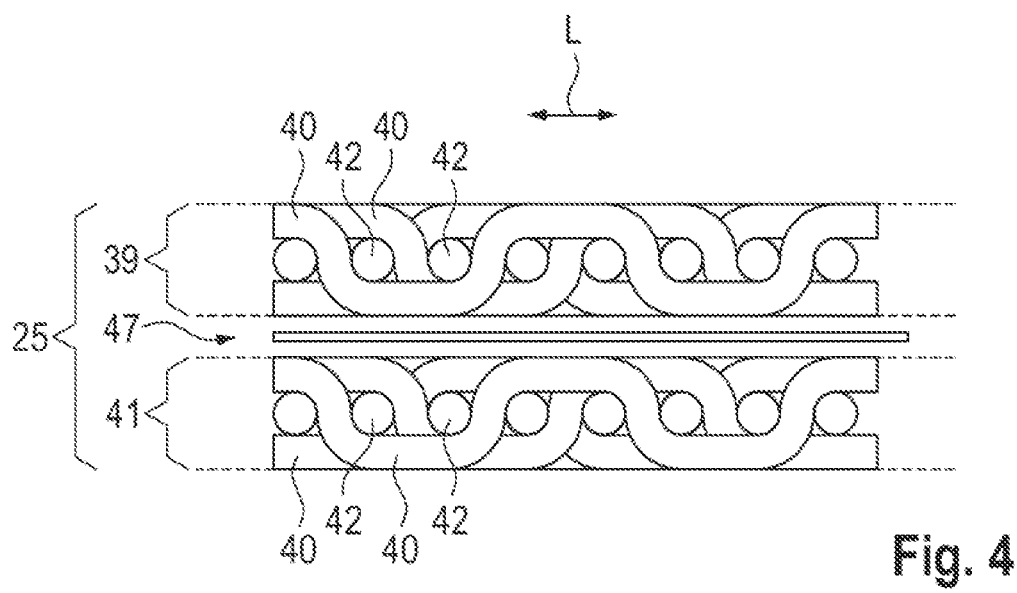
FIGS. 4 through 8 show further exemplary embodiments of the invention.

According to a further exemplary embodiment, the material structure of a belt strap 25 is shown in an enlarged partial sectional representation in FIG. 4. Accordingly, belt strap 25 shown in FIG. 4 has a two-layer structure including two belt strap layers 39, 41. The two belt strap layers 39, 41 are sewn to each other (in a manner not illustrated). As is further apparent from FIG. 4, each of the two belt strap layers 39, 41 is woven in an identical way, including warp threads 40 and weft threads 42.

Figure 5:
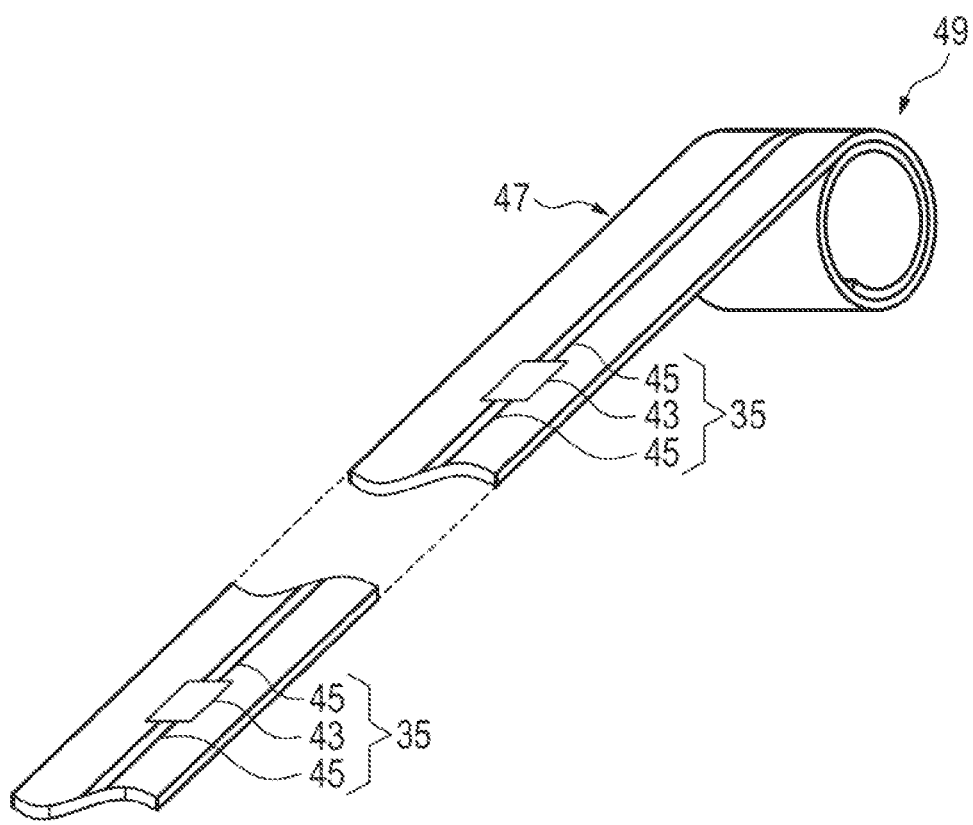

A continuous film sheet 47 runs between the two belt strap layers 39, 41 in belt strap longitudinal direction L (FIG. 4), to which at least one belt retractor transponder 35, made up of a chip 43 and an antenna 45 is applied according to FIG. 5. Continuous film sheet 47 extends completely over the entire belt strap length of belt strap 25. As is apparent from FIG. 5, continuous film sheet 47 is provided on a roll 49 for a manufacturing of the belt strap. In total, a multiplicity of belt retractor transponders 35 are applied to continuous film sheet 47. During the belt strap manufacturing process, film sheet roll 49 is unwound, and unwound continuous film sheet 47 is positioned between the two belt strap layers 39, 41 in belt strap longitudinal direction L.

Figure 6:
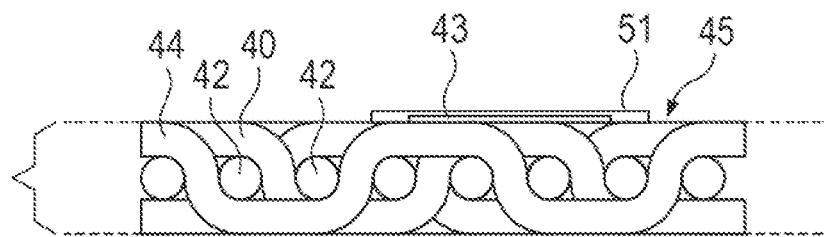

In contrast to FIG. 4, belt strap 25 in FIG. 6 is implemented as an insert structure with interwoven warp threads 40 and weft threads 42. Of warp threads 40, one modified warp thread 44 is woven in, which has an antenna property of an RFID transponder. In FIG. 6, a transponder chip 43 is positioned on belt strap surface 46 and is in contact with modified antenna warp thread 44.

Transponder chip 43 in FIG. 6 is positioned between a chip carrier 51 and the belt strap surface, i.e., it is protected against external mechanical influences. Chip carrier 51 is integrally connected with its plastic material to the belt strap material, for example by thermoforming.

Figure 7:
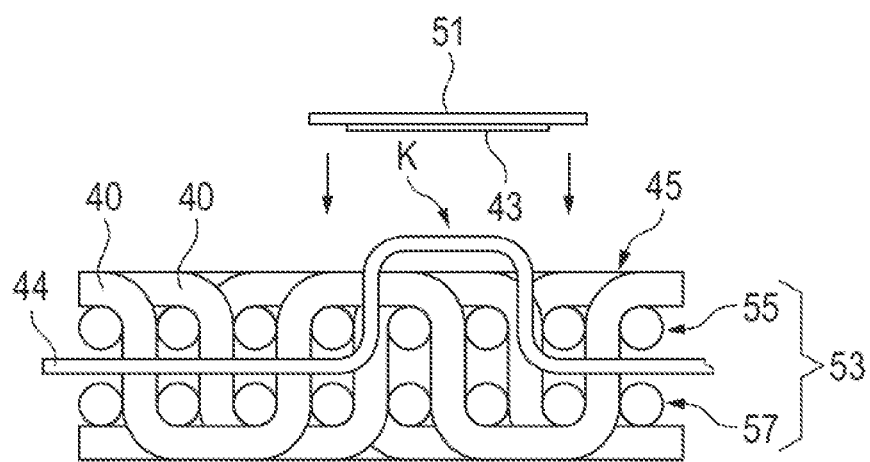

A one-layer belt strap 25 according to a further exemplary embodiment is shown in FIG. 7. Accordingly, a weft thread double layer 53 is woven in one-layer belt strap 25. Weft thread double layer 53 includes weft thread layers 55, 57 situated one on to of the other, viewed in the belt strap thickness direction. A modified antenna warp thread 44 is placed between the two weft thread layers 55, 57. In FIG. 6, it is exposed to the outside at a contact point K, at which transponder chip 43 may be brought into contact with modified warp thread 44. As illustrated in FIG. 6, transponder chip 43 may, in turn, be integrally connected to belt strap surface 46 via its chip carrier 51.

Figure 8:
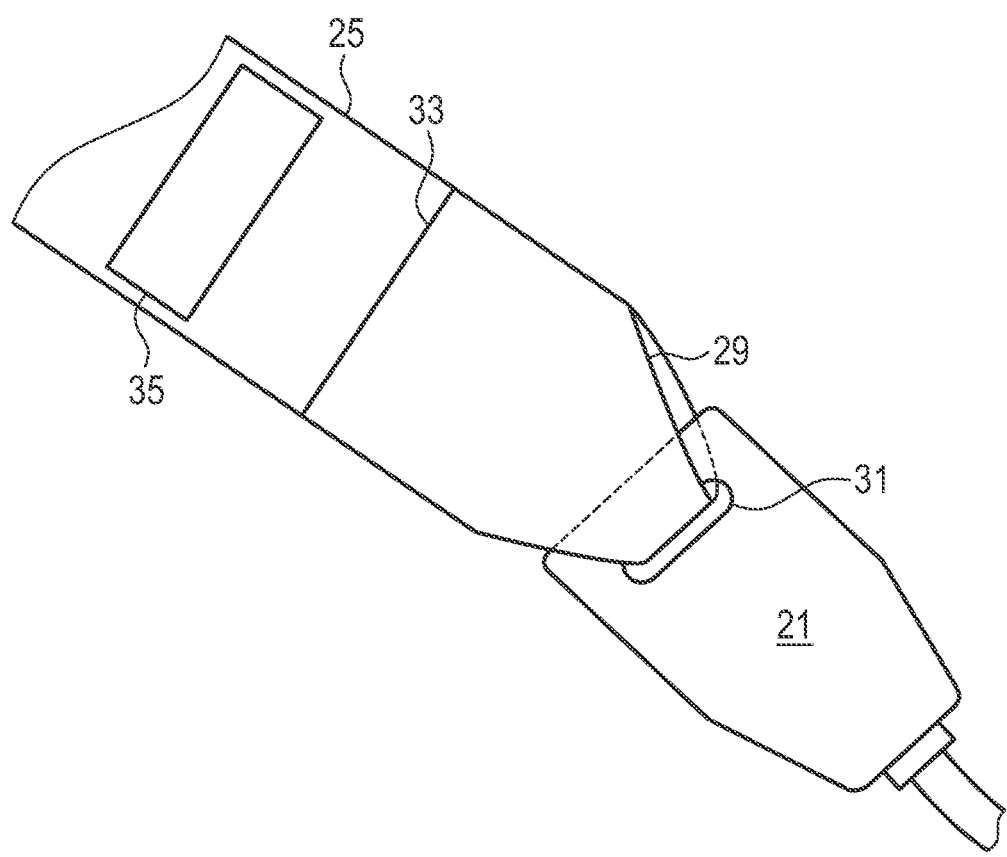

A belt strap 25 according to a further design variant is illustrated in FIG. 8, in which belt retractor transponder 35 is implemented as a standard transponder. In FIG. 7, it is glued or sewed onto belt strap 25 at an arbitrary, suitable point. For example, belt retractor transponder 35 may be glued to the belt strap end, as indicated in FIG. 8.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for manufacturing a vehicle, the method comprising:

mounting attachments on a vehicle body on a production line of a vehicle-manufacturing plant;

fastening an attachment transponder to each of the mounting attachments, the attachment transponder being detected with the aid of an RFID reading device after the installation of the particular attachment in the vehicle for the purpose of a construction state documentation;

installing a belt retractor of a safety belt assembly as the attachment in a cavity of a vehicle body column formed as a hollow girder on the production line;

assigning at least one belt retractor transponder to the belt retractor, wherein the belt retractor transponder is not fastened directly to the belt retractor, but rather to a belt strap of the belt retractor outside the body column cavity.

2. The method according to claim 1, wherein the belt strap fed out from the belt retractor includes a belt end fitting on its belt strap end, which is fastened to an end fitting tensioner or, in a stationary manner, to the vehicle body in the vehicle interior, and, wherein the belt retractor transponder is fastened to the belt strap end.

3. The method according to claim 1, wherein the belt strap has a two-layer structure, in which the belt strap layers are sewn to each other, and wherein the belt retractor transponder is integrated into the two-layer structure, and wherein the belt retractor transponder is arranged between the two belt strap layers and is sewn therein.

4. The method according to claim 3, wherein the belt strap is folded over at the belt strap end for connection to the belt fitting thereby forming a belt strap loop, which is fed through a belt eye of the belt end fitting, and wherein the belt strap fold and the belt strap form a two-layer structure, in which the two belt strap layers are connected or sewn to each other.

5. The method according to claim 4, wherein the belt retractor transponder is integrated into the two-layer structure made up of the belt strap fold and the belt strap, and, wherein the belt retractor transponder is arranged between the belt strap fold and the belt strap and is sewn therein.

6. The method according to claim 1, wherein the belt retractor transponder includes a chip and an antenna, and/or wherein the belt retractor transponder is provided, together with a plurality of further belt retractor transponders, on a continuous film sheet, which is adapted to be wound onto a roll, and wherein the continuous film sheet is integrated into the belt strap, stretched along a belt sheet longitudinal direction, during the belt strap manufacturing process, and/or is positioned between the two belt strap layers, and/or, the continuous film sheet extends completely over the entire length of the belt strap.

7. The method according to claim 1, wherein the belt strap has an insert structure with interwoven warp threads and weft threads, and, of the warp threads, at least one modified warp thread has an antenna property of an RFID transponder, and, at least one transponder chip is positioned on the belt strap surface and is in contact with the modified warp thread, and, the transponder chip is positioned between a chip carrier and the belt strap surface, the chip carrier being integrally connected to the belt strap by thermoforming.

8. The method according to claim 7, wherein the one-layer belt strap includes a weft thread double layer, including weft thread layers situated one on top of the other in the belt strap thickness direction, and, wherein the modified warp thread is placed between the two weft thread layers and/or the modified warp thread is exposed to the outside at a contact point at which the transponder chip is in contact with the modified warp thread exposed to the outside.

9. The method according to claim 1, wherein the belt retractor transponder is designed as a standard transponder, which is glued or sewn to the finished belt strap approximately at the belt strap end.

10. A safety belt assembly for installation in a vehicle body according to the method according to claim 1, wherein the safety belt assembly includes a belt retractor, which is identified by a belt retractor transponder, and the belt retractor transponder is fastened to the belt strap fed out from the belt retractor.

* * * * *